United States Patent
Elhardt et al.

(10) Patent No.: US 9,510,503 B2
(45) Date of Patent: Dec. 6, 2016

(54) GRASS MOWING MACHINE OPERATOR PLATFORM

(71) Applicants: Paul Elhardt, Charlotte, NC (US);
Kyle T. Ressler, West Bend, WI (US);
Thomas R. Genz, Lake Mills, WI (US)

(72) Inventors: Paul Elhardt, Charlotte, NC (US);
Kyle T. Ressler, West Bend, WI (US);
Thomas R. Genz, Lake Mills, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 13/653,959

(22) Filed: Oct. 17, 2012

(65) Prior Publication Data

US 2014/0103629 A1    Apr. 17, 2014

(51) Int. Cl.
*B60P 3/22*       (2006.01)
*A01D 34/00*    (2006.01)
*A01D 34/81*    (2006.01)

(52) U.S. Cl.
CPC ............ *A01D 34/001* (2013.01); *A01D 34/81* (2013.01)

(58) Field of Classification Search
CPC .................................................... A01D 34/81
USPC .............................. 296/65.05, 181.2, 901.01
See application file for complete search history.

(56) References Cited

U.S. PATENT DOCUMENTS

| | | | |
|---|---|---|---|
| 3,093,948 A * | 6/1963 | Root ............................... | 56/17.1 |
| 3,934,392 A * | 1/1976 | Moery et al. ................... | 56/202 |
| 4,738,328 A * | 4/1988 | Hayden ......................... | 180/307 |
| 4,924,665 A * | 5/1990 | Crosley ........................... | 56/295 |
| 5,042,239 A * | 8/1991 | Card ............................... | 56/14.7 |
| 5,238,267 A | 8/1993 | Hutchison et al. | |
| 5,558,368 A | 9/1996 | Cerny et al. | |
| 5,638,668 A * | 6/1997 | Kallevig et al. ............. | 56/320.1 |
| 5,727,372 A * | 3/1998 | Kanitz et al. .................. | 56/11.9 |
| 5,787,693 A * | 8/1998 | Dyke .............................. | 56/11.9 |
| 6,497,453 B2 | 12/2002 | Bates et al. | |
| 6,530,200 B1 * | 3/2003 | Minoura et al. .............. | 56/17.1 |
| 6,708,805 B2 * | 3/2004 | Samejima et al. .......... | 192/13 A |
| 7,458,432 B2 * | 12/2008 | Mayer et al. ................. | 180/6.32 |
| 7,607,283 B2 * | 10/2009 | Wright et al. ................ | 56/17.1 |
| 7,686,108 B2 * | 3/2010 | Piontek ......................... | 180/6.48 |
| 7,712,294 B2 * | 5/2010 | Wright et al. ................ | 56/17.1 |
| 7,882,914 B2 | 2/2011 | Scheele et al. | |
| 7,950,211 B1 * | 5/2011 | Ta ................................... | 56/12.7 |
| 8,087,481 B2 * | 1/2012 | Trefz et al. ................... | 180/6.32 |
| 8,186,475 B2 | 5/2012 | Sugden et al. | |
| 8,235,151 B2 * | 8/2012 | Nunez et al. ................ | 180/6.32 |
| 8,522,901 B1 * | 9/2013 | Vanlue ......................... | 180/6.32 |

(Continued)

FOREIGN PATENT DOCUMENTS

EP        0523850 A2    1/1993

OTHER PUBLICATIONS

EP Search Report dated Jan. 29, 2014 (5 pages).

*Primary Examiner* — Joseph Rocca
*Assistant Examiner* — Conan Duda (57) ABSTRACT

A grass mowing machine operator platform includes a one-piece plastic composite molded structure with a top surface and an outer wall, and a plurality of slots in the top surface and outer wall. A pair of steering levers may be pivotably mounted to steering pivot bolts in the slots in the top surface, and a brake lever pivotably mounted in a slot in the outer wall. The slots where the steering levers and brake lever are mounted have integral bearing surfaces.

14 Claims, 8 Drawing Sheets

(56) References Cited

U.S. PATENT DOCUMENTS

| | | | |
|---|---|---|---|
| 2004/0000130 A1* | 1/2004 | Bartel | 56/11.3 |
| 2004/0103629 A1* | 6/2004 | Velke et al. | 56/10.5 |
| 2006/0123756 A1* | 6/2006 | Eavenson et al. | 56/10.2 R |
| 2006/0156705 A1* | 7/2006 | Lindell | 56/17.5 |
| 2006/0172857 A1* | 8/2006 | Eavenson et al. | 477/203 |
| 2006/0174601 A1* | 8/2006 | Piontek | 56/11.3 |
| 2006/0228943 A1* | 10/2006 | Grinnall | 439/590 |
| 2006/0277884 A1* | 12/2006 | Bucher | 56/10.2 R |
| 2007/0169456 A1* | 7/2007 | Komorida et al. | 56/17.1 |
| 2009/0064650 A1* | 3/2009 | Eberle et al. | 56/14.7 |
| 2009/0217636 A1 | 9/2009 | Loxterkamp et al. | |
| 2010/0154373 A1* | 6/2010 | Newell | 56/14.7 |
| 2010/0192746 A1* | 8/2010 | Flood et al. | 83/697 |
| 2011/0143883 A1* | 6/2011 | Huibregtse et al. | 477/185 |
| 2012/0159916 A1* | 6/2012 | Ishii et al. | 56/10.2 A |
| 2012/0279192 A1* | 11/2012 | Newell | 56/229 |

* cited by examiner

GRASS MOWING MACHINE OPERATOR PLATFORM

FIELD OF THE INVENTION

The present invention relates to grass mowing machines, and specifically to a grass mowing machine operator platform.

BACKGROUND OF THE INVENTION

Grass mowing machines typically include a frame that supports the machine's components including an internal combustion engine, battery pack or other power source, axles, wheels, steering and brake systems and an operator seat. The operator seat may be mounted between the front and rear axles, either to the middle or toward the rear of the frame. The engine, battery pack or other power source may be mounted to the frame forwardly of the operator seat, or in the case of a zero turn riding mower, behind the operator seat at the rear of the frame. Steering and brake controls may be located mid frame where an operator may access them from the operator seat. For example, zero turn riding mowers may have dual lever steering levers mounted to the frame on the left and right of the operator seat that an operator can pivot fore and aft, and also side-to-side, to control a pair of rear wheel motors. Brake systems on grass mowing machines may be actuated using a pedal and/or lever that may be mounted to the mid frame forwardly of the operator seat and/or beside the seat. A fuel tank may be mounted adjacent or behind the operator seat. Deck or implement lift systems may be mounted to the mid frame of the machine so that an operator may use a pedal and/or lever to raise and lower the deck or other implement. Additionally, engine and electrical controls and gauges may be mounted to a control panel in front of or next to the operator seat Mounting these components onto the mid frame of a grass mowing machine can be complex and difficult. For example, mounting brackets, fasteners and other attachment devices may be used to attach and hold the components to the frame. The number of mounting brackets, fasteners and other attachment devices increases the complexity of grass mowing machines, adds to the parts count and cost, and contributes significant time to the assembly process. These parts also may reduce a machine's reliability and performance. A grass mowing machine operator platform is needed that can reduce complexity, reduce the parts count and cost, reduce assembly time, and increase reliability and performance.

SUMMARY OF THE INVENTION

A grass mowing machine operator platform having a one-piece plastic composite molded structure mounted on a grass mowing machine frame. The one-piece plastic composite molded structure may include hinge supports molded into a top front wall that pivotably support an operator seat, steering lever slots molded into a top surface and having integral bearing surfaces pivotably supporting a pair of steering levers, and brake lever slots molded into a side wall and having integral bearing surfaces pivotably supporting a brake lever.

DESCRIPTION OF THE PREFERRED EMBODIMENT

Figure 1:
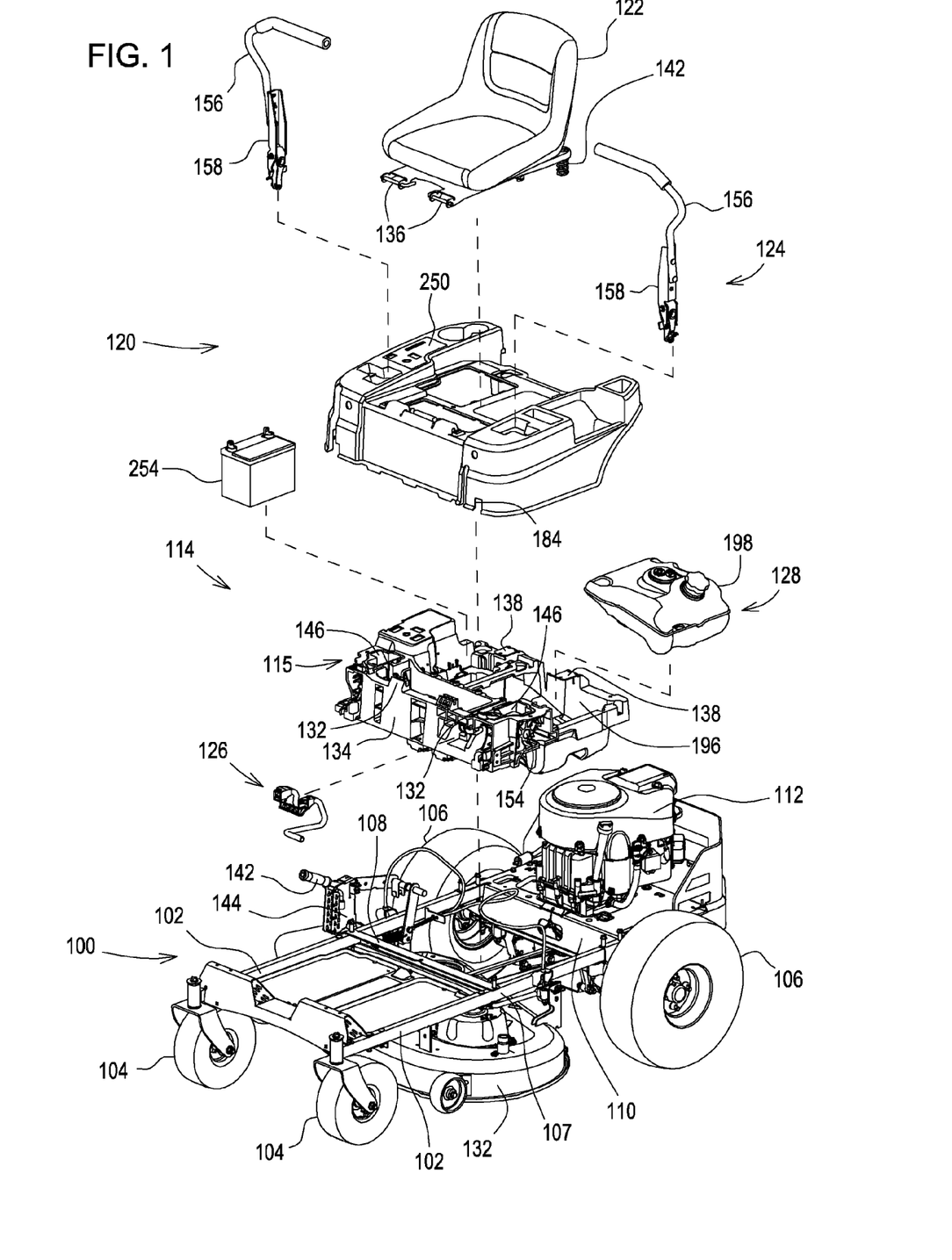
FIG. 1 is an exploded perspective view of a grass mowing machine with an operator platform according to one embodiment of the invention.

As shown in FIG. 1, in one embodiment, grass mowing machine 100 may be a zero turn riding mower having a pair of longitudinal frame members 102 supported by a pair of front caster wheels 104 at or near the front end of the longitudinal frame members, and a pair of rear traction drive wheels 106 at or near the rear end of the longitudinal frame members. The grass mowing machine frame 107 also may include front and rear cross members or plates 108, 110 extending between the longitudinal frame members. Internal combustion engine 112 may be mounted to the frame rearwardly of the rear cross member or onto a rear plate. Alternatively, a battery pack or other power source may be mounted on or to the rear of the frame, instead of an internal combustion engine. In other embodiments, the grass mowing machine may be a lawn tractor having an internal combustion engine, battery pack or other power source mounted forwardly of one or both cross members.

Figure 2:
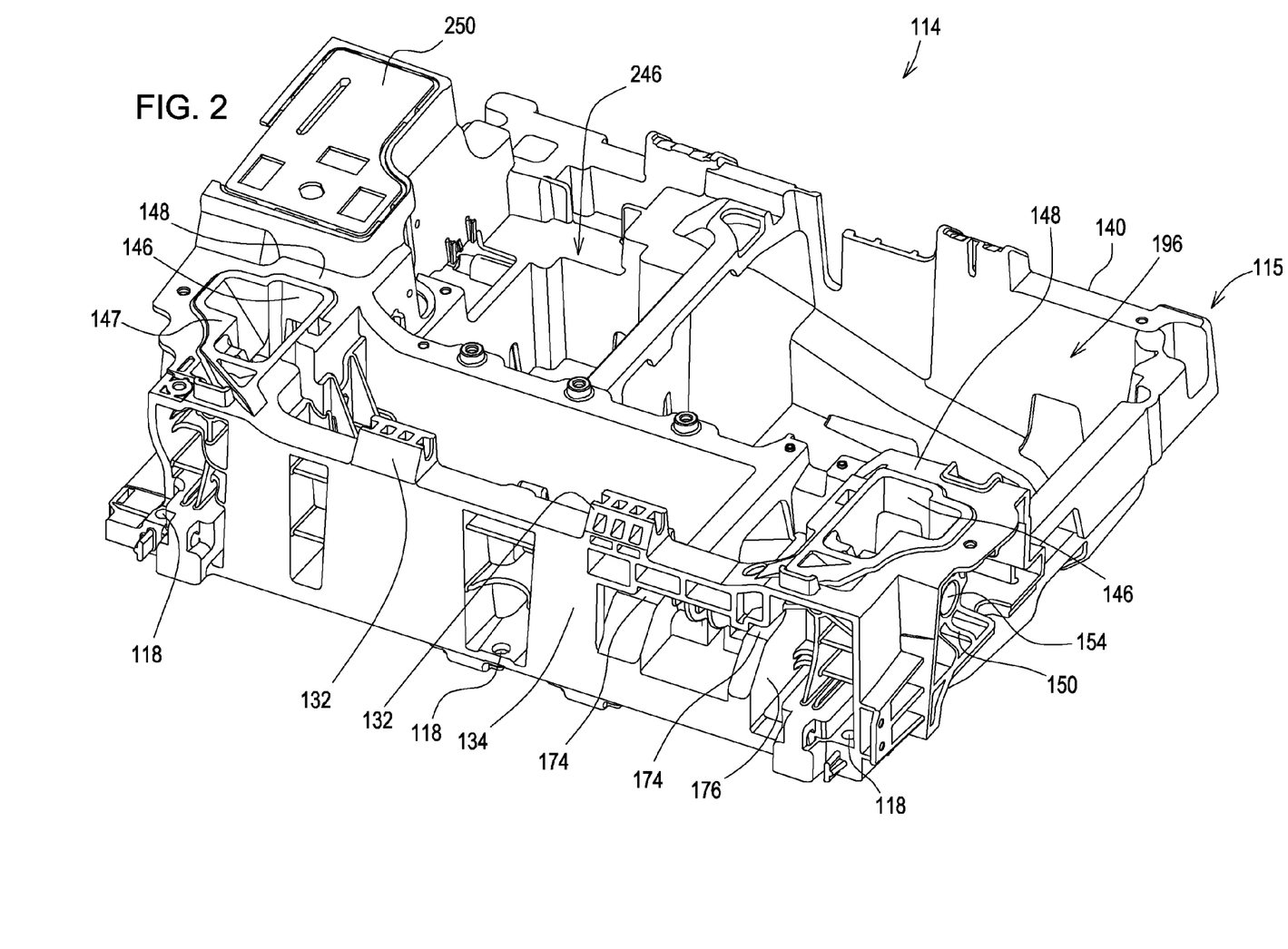
FIG. 2 is a top perspective view of a grass mowing machine operator platform according to one embodiment of the invention.

As shown in FIG. 2, in one embodiment, grass mowing machine operator platform 114 may include a one-piece plastic composite molded structure 115 that may be mounted to the grass mowing machine frame. The one-piece plastic composite molded structure may be positioned between the longitudinal frame members, adjacent or between the front and rear cross members. The one-piece plastic composite molded structure may be fastened to and supported by the longitudinal frame members and cross members. For example, the one-piece plastic composite molded structure may be fastened to the frame at six attachment points using shoulder bolts 116 through mounting holes 118 near the perimeter of the operator platform. The one-piece plastic composite molded structure may also be covered by plastic shroud 120 over the top and side surfaces of the structure, and the plastic shroud may be secured to the operator platform with rivets or other fasteners.

In one embodiment, the one-piece plastic composite molded structure may be blow molded using high pressure structural foam, most preferably 30% glass filled polypropylene with a blowing agent. The structure may be molded from a variety of different plastic materials having high strength and rigidity. For example, the material may be in the range of about 15% to about 50% glass filled polypropylene, polyamide or polyethylene. The one-piece plastic composite molded structure may have walls with a wall thickness between about 5 mm and about 7 mm. The one-piece plastic composite molded structure may form a ribbed support structure having a plurality of interior pockets and compartments. The pockets or compartments in may isolate components such as a battery, fuse and relay block from heat, moisture, dirt or other contaminants.

In one embodiment, one-piece plastic composite molded structure of grass mowing machine operator platform 114 may provide the sole or only support structure for operator seat 122 and one or more operating systems of the grass mowing machine including steering system 124, brake system 126, fuel system 128 and deck lift system 130. One or more of the systems may be mounted to the grass mowing machine operator platform before the structure is installed on the grass mowing machine. As assembled, the operator platform may include the operator seat, steering system, brake system, fuel system and deck lift system.

Figure 3:
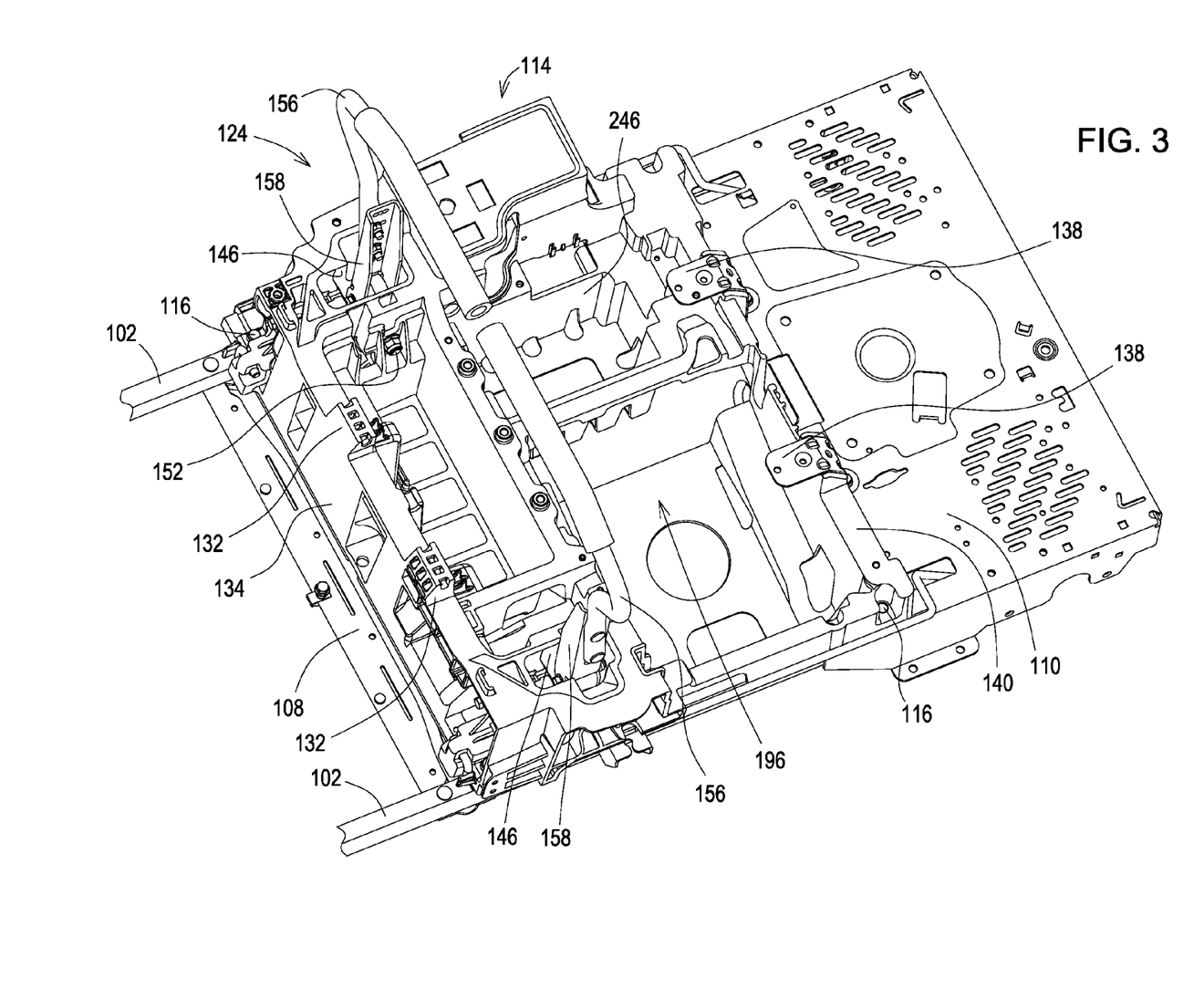
FIG. 3 is a top perspective view of a grass mowing machine operator platform with a steering system according to one embodiment of the invention.

In one embodiment shown in FIG. 3, the one-piece plastic composite molded structure may include seat hinge supports 132 on top of front wall 134 of the operator platform. The seat hinge supports on the front wall of the one-piece plastic composite molded structure may provide a horizontal pivot axis for the operator seat to pivot or tip rearwardly to a normal use position, and forwardly to a non-use position. A pair of seat hinge pins 136 may be inserted through the seat hinge supports and a lower front portion of the operator seat. Additionally, the one-piece plastic composite molded structure may include seat spring supports 138 which may be sheet metal members attached to the top of back wall 140 of the operator platform, and may provide a contact surface for coil springs 142 under the operator seat. The seat spring supports also may be secured to the rear cross member of the frame using threaded fasteners to help retain the operator platform to the frame. The coil springs may rest on the seat spring supports while the seat is in the normal or use position.

Figure 4:
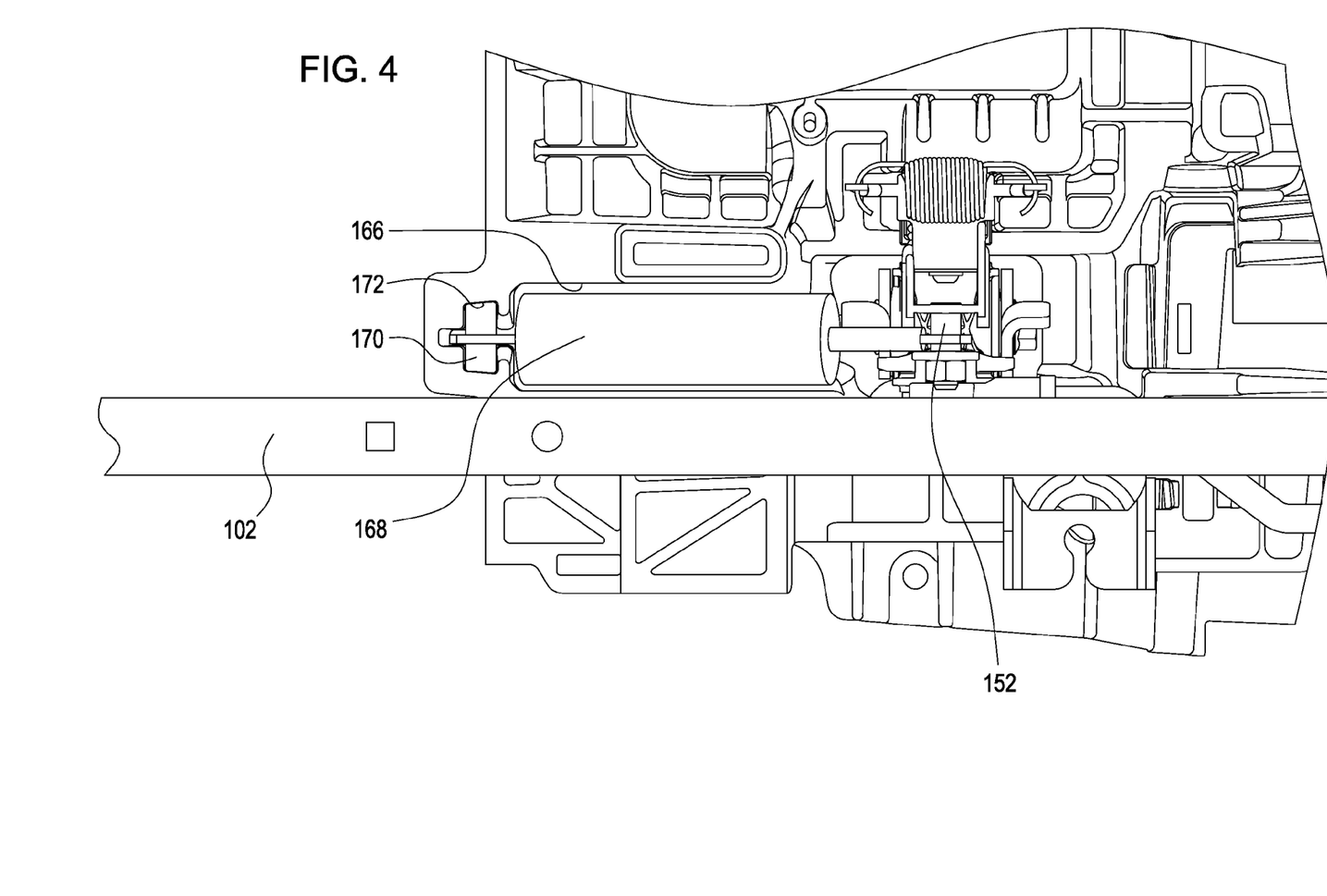
FIG. 4 is bottom view of a portion of the grass mowing machine operator platform with a steering system according to one embodiment of the invention.

In one embodiment shown in FIG. 3, the one-piece plastic composite molded structure may include L-shaped or T-shaped steering lever slots 146 molded into a top 147 of the structure for mounting the steering system of a zero turn riding mower. The steering lever slots may have double walls 148 and reinforcing ribs 150 to enhance their rigidity. Steering pivot bolts 152 may be attached and secured to integral bearing surfaces 154 through the double walls of the steering lever slots. With integral bearing surfaces molded into the one-piece plastic composite molded structure, bushings are not required. Dual steering levers 156 may be attached to pivot members 158 inserted through the steering lever slots and pivotably attached to the steering pivot bolts. The steering lever slots in the one-piece plastic composite molded structure may provide stops for the dual steering levers, to pivot in forward or reverse as the steering levers are used to turn the traction wheels and steer the machine, and to the left and right as the steering levers are pivoted to park the zero turn riding mower and enter or exit the operator seat. The steering lever slots may include sloped internal surfaces that provide stops for each of the dual steering levers in the parked position. The plastic shroud may have openings 160 for the steering lever slots. The steering lever slots also may include recessed nut pocket surfaces for the threaded fasteners, to help move the load path away from notches in the slots. Now referring to FIG. 4, the one-piece plastic composite molded structure of the grass mowing machine operator platform also may include channels 166 in the bottom surface to locate and provide access to shock absorbers 168 for the dual lever steering levers. A first end of each shock absorber may be attached to the steering pivot bolt, and a second end may be attached to L-shaped pin 170 inserted through notch 172 in the operator platform.

Figure 5:
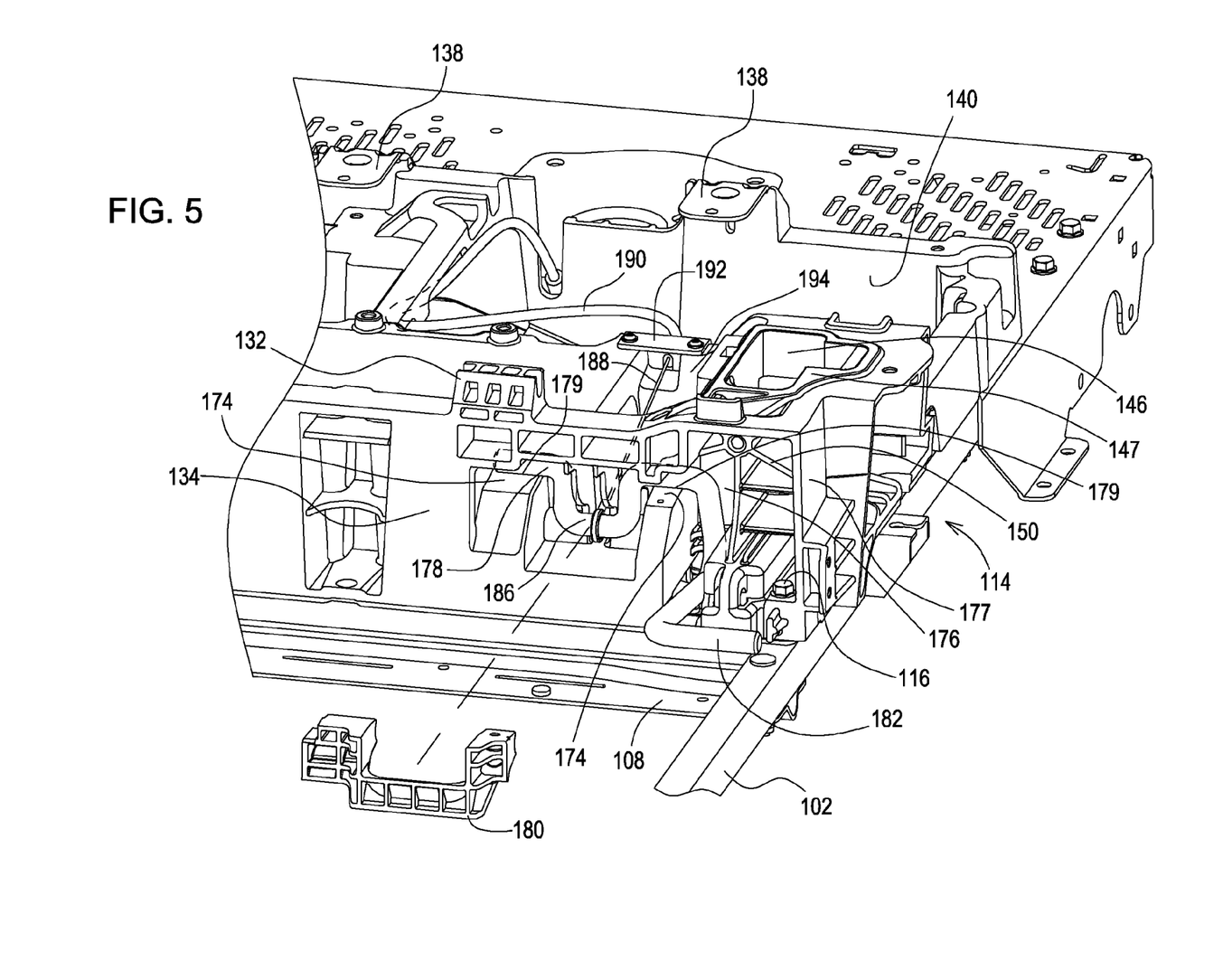
FIG. 5 is a front perspective view a portion of a grass mowing machine operator platform with a brake system according to one embodiment of the invention.

In one embodiment shown in FIG. 5, the one-piece plastic composite molded structure of the grass mowing machine operator platform may include brake lever slots 174 and brake handle opening 176 in the front side wall 177 of the operator platform for mounting the brake system. Each brake lever slot may have an integral bearing surface 179 of at least about 1 cm in length along the axis of brake lever 178. Because of the integral bearing surfaces 179, bushings are not required. Brake lever retainer 180 may be attached and secured to the front wall of the one-piece plastic composite molded structure to capture and retain the brake lever on integral bearing surfaces of the brake lever slots. The brake lever may be a one piece rod or wire form having a first or handle end 182 that may extend through the brake handle opening. The plastic shroud also may have opening 184 for the brake lever handle. To apply the brake, an operator may lift the handle to pivot the brake lever between top and bottom stops provided by the opening in the front wall. An offset or U-shaped portion 186 of the brake lever may be attached to brake cable 188. Lifting or lowering the handle may pivot the brake lever between the stops, retracting or releasing the brake cable. Brake cable conduit 190 may be fastened to brake cable conduit support bracket 192 secured to internal wall 194 of the one-piece plastic composite molded structure. The brake cable conduit housing the brake cable may be routed through the structure to the rear of the operator platform, where the brake cable may branch to a pair of cables attached to brake pawls or calipers (not shown) that may apply braking pressure to the rear traction drive wheels.

Figure 6:
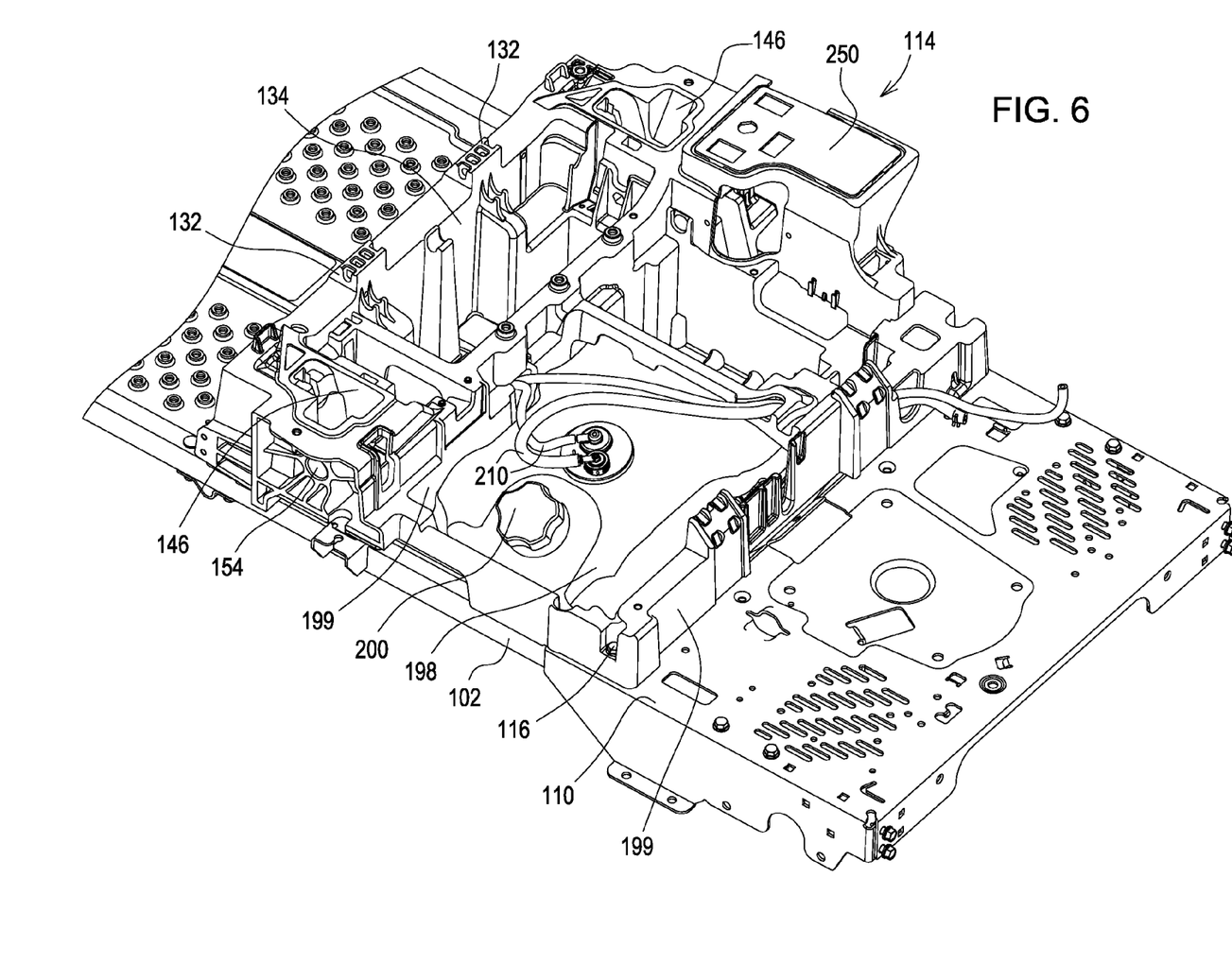
FIG. 6 is a top perspective view of a grass mowing machine operator platform with a fuel system according to one embodiment of the invention.
Figure 7:
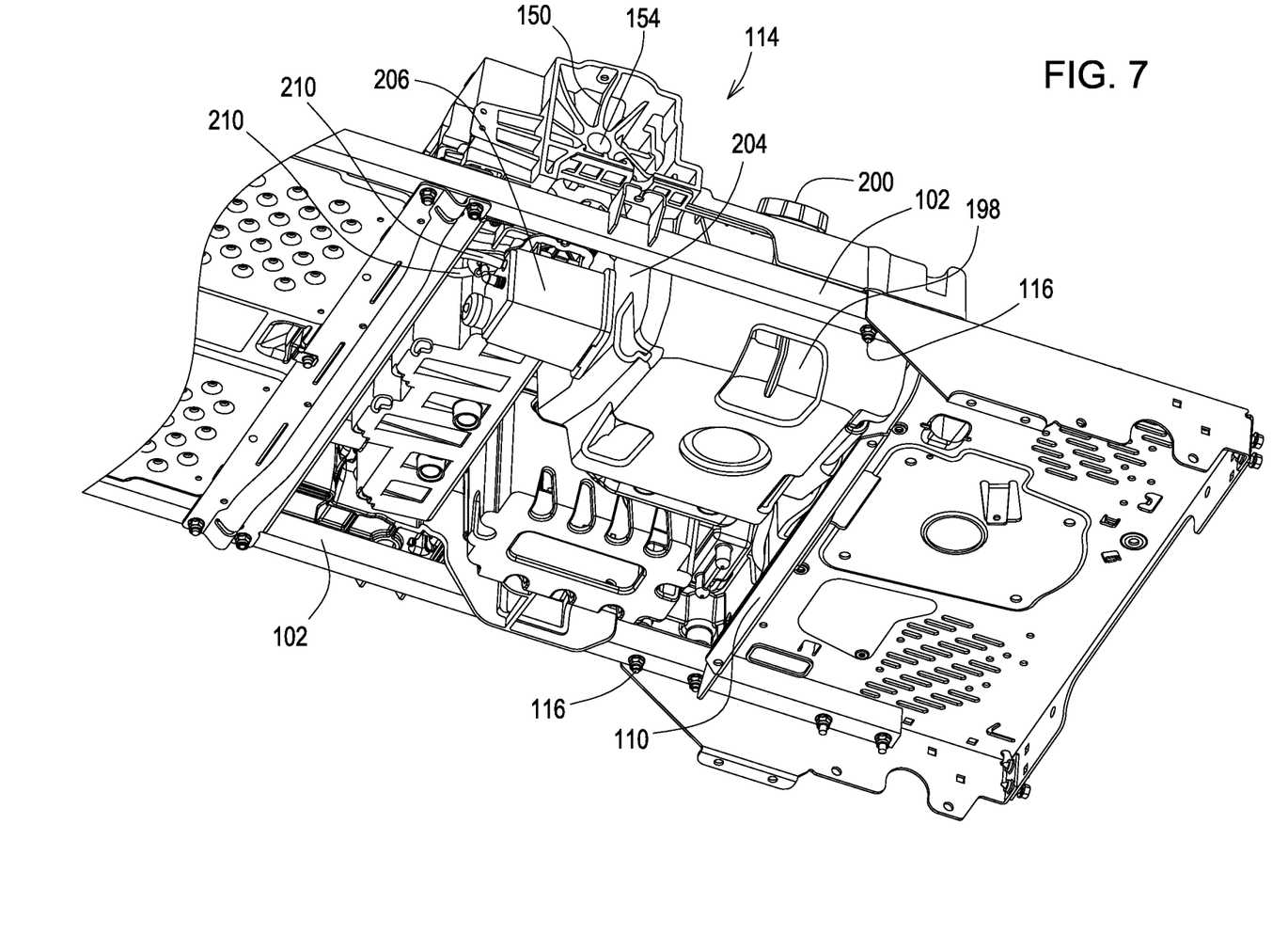
FIG. 7 is a bottom perspective view of a grass mowing machine operator platform with fuel system according to one embodiment of the invention.

In one embodiment shown in FIG. 6, the grass mowing machine operator platform may include fuel tank compartment 196 for mounting fuel tank 198. The fuel tank compartment may provide protective walls 199 around the fuel tank. Fuel tank cap 200 on the filler neck of the fuel tank may be accessed through an opening in the plastic shroud. Now referring to FIG. 7, the underside of the operator platform may include pocket or recess 204 for mounting carbon canister 206 connected to the fuel tank by vapor hoses 210.

Figure 8:
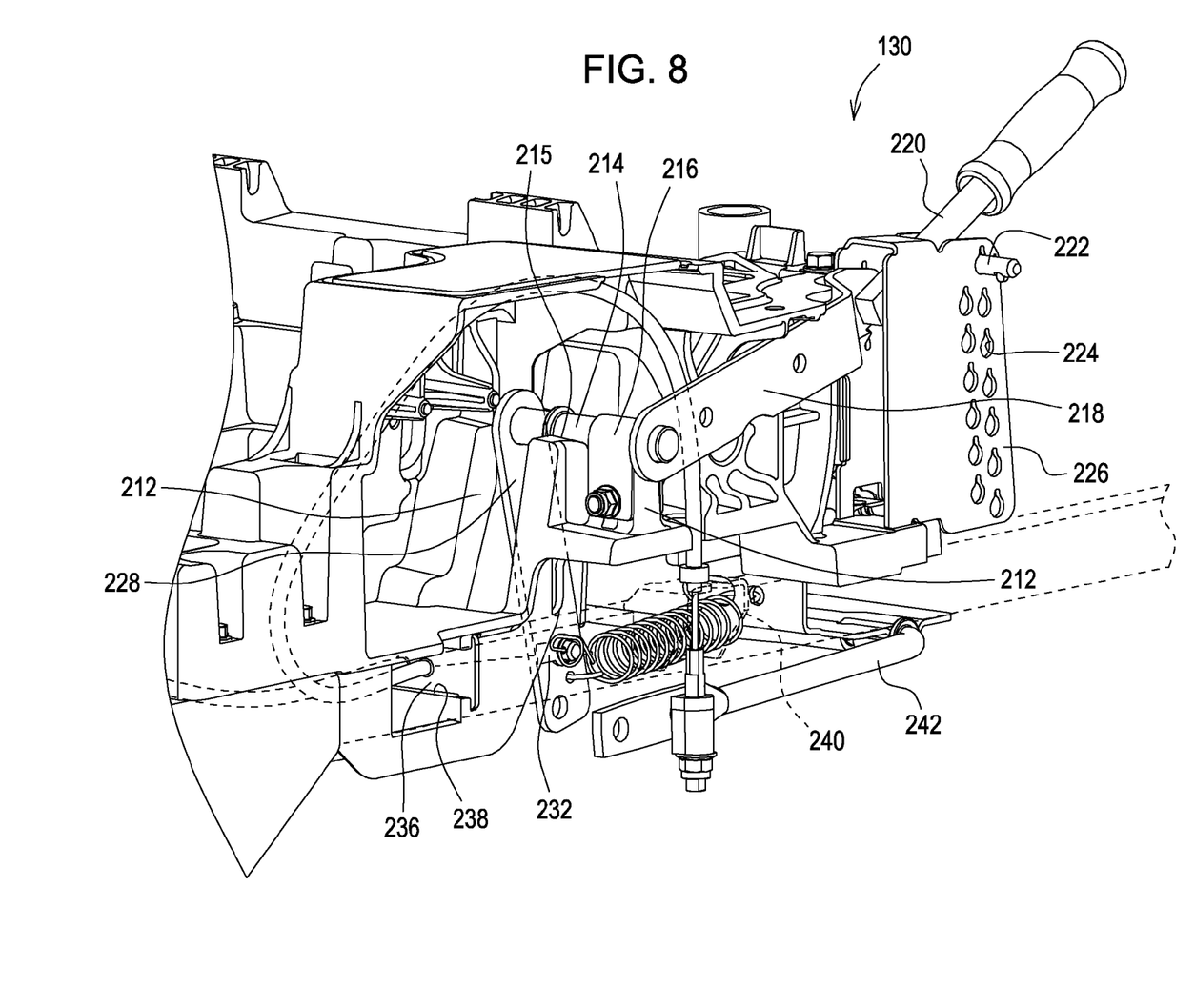
FIG. 8 is a side perspective view of a portion of a grass mowing machine with a deck lift system according to one embodiment of the invention.

In one embodiment, shown in FIG. 8, the one-piece plastic composite molded structure may include deck lift shaft supports 212 adjacent one side of the operator platform for mounting the deck lift system. The deck lift shaft supports may have integral bearing surfaces 215 of at least about 1 cm in length along the axis of deck lift shaft 214. Shaft retainer 216 may help hold the deck lift shaft in place on the deck lift shaft supports. Deck lift lever 218 may be attached to the outer end of the deck lift shaft. The deck lift lever may include deck lift handle 220 that may rest on pin 222 inserted through one of holes 224 for an operator-selected height of cut on height of cut sector 226 attached to the longitudinal frame member. The upper end of deck lift crank 228 may be attached to the inner end of the deck lift crank. The deck lift crank may extend from the deck lift shaft down through an opening in the operator platform, where the lower end of the deck lift crank may be attached to deck lift cables 232. Lifting or lowering the deck lift handle may pivot the deck lift shaft and deck lift crank, retracting or releasing the deck lift cables. A first end of deck lift cable conduits 234 may be fastened to deck lift cable conduit support bracket 236 which may be secured to slot 238 in the outer wall of the operator platform. The deck lift cable conduits housing the deck lift cables may be routed through the operator platform and a second end of the conduits may be fastened to weldments 240 on the longitudinal frame members. The deck lift cables may be attached to left and right deck lift arms 242 that are pivotably attached to raise and lower mower deck 244.

In one embodiment, as shown in FIG. 2, the one-piece plastic composite molded structure may include compartment 246 that may be accessed from the top of the operator platform under or adjacent the operator seat. The shroud may provide hinged or removable access panels 250 over the top of the compartment. Compartment 246 may house battery 254, and a fuse and relay block, and/or other electrical components that may need service or replacement. To retain the fuse and relay block in the compartment without requiring hardware or tools, T-shaped ribs on the compartment wall may engage mating slots in the side panel of the fuse and relay block. Additionally, the grass mowing machine operator platform may include one or more compartments under the seat that may provide storage space for various items.

Having described the preferred embodiment, it will become apparent that various modifications can be made without departing from the scope of the invention as defined in the accompanying claims.

We claim:

1. A grass mowing machine operator platform on a grass mowing machine having a frame, an operator seat, a pair of steering levers, and a brake lever, comprising:
    a one-piece plastic composite molded structure mounted on the grass mowing machine frame and having a plurality of pockets and compartments isolating a plurality of components on a top of the structure, a front side wall and an underside of the structure, including:
    a pair of steering lever slots that are L-shaped and molded into a top surface of the one-piece plastic composite molded structure, each steering lever slot having a sloped internal surface providing a stop for one of the steering levers in a parked position, and having double walls and steering pivot bolts on integral bearing surfaces through the double walls of the steering lever slots that pivotably support steering pivot members attached to the pair of steering levers.

2. The grass mowing machine operator platform of claim 1 further comprising at least one storage compartment molded into the one-piece plastic composite molded structure.

3. The grass mowing machine operator platform of claim 1 further comprising a deck lift system with a deck lift shaft and wherein the one-piece plastic composite molded structure further comprises integral bearing surfaces pivotably supporting the deck lift shaft.

4. The grass mowing machine operator platform of claim 1 wherein the one-piece plastic composite molded structure further comprises a fuel tank compartment.

5. A grass mowing machine operator platform of claim 1 further comprising a plastic shroud over the one-piece plastic composite molded structure.

6. The grass mowing machine operator platform of claim 1 further comprising a-pair of brake lever slots molded into a side wall of the one-piece plastic composite molded structure and having integral bearing surfaces pivotably supporting the brake lever.

7. The grass mowing machine operator platform of claim 1 further comprising a pair of shock absorbers positioned in a pair of channels in the underside of the operator platform, each shock absorber having a first end connected to one of the steering pivot bolts and a second end connected to a pin inserted through a notch in the operator platform.

8. A grass mowing machine operator platform on a grass mowing machine having a frame, an operator seat, a pair of steering levers, and a brake lever, comprising: a one-piece plastic composite molded structure mounted on the grass mowing machine frame and having a plurality of pockets and compartments isolating a plurality of components on a top of the structure, a front side wall and an underside of the structure, including: a pair of steering lever slots that are T-shaped and molded into a top surface of the one-piece plastic composite molded structure, each steering lever slot having a sloped internal surface providing a stop for one of the steering levers in a parked position, and having double walls and steering pivot bolts on integral bearing surfaces through the double walls of the steering lever slots that pivotably support steering pivot members attached to the pair of steering levers.

9. The grass mowing machine operator platform of claim 8 further comprising at least one storage compartment molded into the one-piece plastic composite molded structure.

10. The grass mowing machine operator platform of claim 8 further comprising a deck lift system with a deck lift shaft and wherein the one-piece plastic composite molded structure further comprises integral bearing surfaces pivotably supporting the deck lift shaft.

11. The grass mowing machine operator platform of claim 8 wherein the one-piece plastic composite molded structure further comprises a fuel tank compartment.

12. A grass mowing machine operator platform of claim 8 further comprising a plastic shroud over the one-piece plastic composite molded structure.

13. The grass mowing machine operator platform of claim 8 further comprising a-pair of brake lever slots molded into a side wall of the one-piece plastic composite molded structure and having integral bearing surfaces pivotably supporting the brake lever.

14. The grass mowing machine operator platform of claim 8 further comprising a pair of shock absorbers positioned in a pair of channels in the underside of the operator platform, each shock absorber having a first end connected to one of the steering pivot bolts and a second end connected to a pin inserted through a notch in the operator platform.

\* \* \* \* \*